(12) United States Patent
Sollenlid et al.

(10) Patent No.: US 11,312,284 B2
(45) Date of Patent: Apr. 26, 2022

(54) DUMP BODY FOR A WORKING MACHINE AND A WORKING MACHINE

(71) Applicant: Volvo Construction Equipment AB, Eskilstuna (SE)

(72) Inventors: Lena Sollenlid, Växjö (SE); Peter Johansson, Växjö (SE); Jörgen Ahlberg, Växjö (SE)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 159 days.

(21) Appl. No.: 16/491,690

(22) PCT Filed: Mar. 7, 2018

(86) PCT No.: PCT/EP2018/055592
§ 371 (c)(1),
(2) Date: Sep. 6, 2019

(87) PCT Pub. No.: WO2018/162549
PCT Pub. Date: Sep. 13, 2018

(65) Prior Publication Data
US 2020/0055437 A1 Feb. 20, 2020

(30) Foreign Application Priority Data
Mar. 7, 2017 (EP) .................................. 17159626

(51) Int. Cl.
*B60P 1/28* (2006.01)
(52) U.S. Cl.
CPC ...................... *B60P 1/28* (2013.01)
(58) Field of Classification Search
CPC .. B60P 1/28; B60P 1/283; B60P 1/286; B60P 1/16; B60P 1/04; B60P 1/26; B60P 3/423;
(Continued)

(56) References Cited

U.S. PATENT DOCUMENTS 3,307,724 A * 3/1967 Miller ...................... B66F 9/19
414/420
3,552,798 A 1/1971 Cole et al.
(Continued)

FOREIGN PATENT DOCUMENTS

DE 1767305 5/1958
DE 1850703 4/1962
(Continued)

OTHER PUBLICATIONS

International Search Report and Written Opinion of the International Searching Authority, PCT/EP2018/055592, dated Jun. 14, 2018, 11 pages.
(Continued)

*Primary Examiner* — D Glenn Dayoan
*Assistant Examiner* — Sunsurraye Westbrook
(74) *Attorney, Agent, or Firm* — Sage Patent Group

(57) ABSTRACT

A dump body for a hauler vehicle, and a hauler vehicle adapted for such a body. The dump body can be equipped to an autonomous, and electric or hybrid, working machine. The working machine includes a dump body and a working machine frame. The dump body includes at least one guide portion having a guide surface facing downwards and being arranged at the load supporting end portion, the guide portion being configured to transfer the load of the dump body, and a second end portion of the working machine frame includes at least one guiding plate arranged to receive the at least one guide portion of the dump body, whereby the guide portion and the at least one guiding plate are arranged such that the dump body is guided towards a centered position on the working machine during a pivotal downward movement towards said working machine frame of the working machine.

8 Claims, 4 Drawing Sheets

(58) Field of Classification Search
CPC .......... B60P 1/045; B60P 1/02; B60P 1/4407;
B60P 3/05
USPC ...... 298/17 R, 22 R, 17.5, 2, 11, 17.8, 17 B,
298/22 P, 18, 19 R, 23 TT, 1 A
See application file for complete search history.

(56) References Cited

U.S. PATENT DOCUMENTS

| | | | | |
|---|---|---|---|---|
| 3,844,616 | A * | 10/1974 | Acker | B60P 1/165 |
| | | | | 298/10 |
| 6,210,088 | B1 * | 4/2001 | Crosby | B60P 7/132 |
| | | | | 410/35 |
| 7,055,912 | B2 * | 6/2006 | Luscombe | B60P 3/00 |
| | | | | 182/2.9 |
| 8,936,319 | B2 * | 1/2015 | Niva | B60P 1/283 |
| | | | | 298/17 R |
| 10,829,026 | B2 * | 11/2020 | Kibler | B60P 1/283 |

FOREIGN PATENT DOCUMENTS

| | | |
|---|---|---|
| EP | 0749870 A1 | 12/1996 |
| SE | 536500 C2 | 1/2014 |

OTHER PUBLICATIONS

Summons to Oral Proceedings, European Patent Application No. 18709563.3, mailed Nov. 29, 2021, 54 pages.

* cited by examiner

DUMP BODY FOR A WORKING MACHINE AND A WORKING MACHINE

CROSS REFERENCE TO RELATED APPLICATIONS

This application is a 35 U.S.C. § 371 national stage application of PCT International Application No. PCT/EP2018/05592 filed on Mar. 7, 2018, which in turn claims priority to European Patent Application No. 17159626.5 filed on Mar. 7, 2017, the disclosures and content of which are incorporated by reference herein in their entireties.

TECHNICAL FIELD

The invention relates to a working machine for carrying a load having a dump body. The invention also relates to an autonomous, and electric or hybrid, working machine being equipped with such a dump body.

BACKGROUND

In the field of construction equipment there are a number of different working machines used to move, haul or dig material such as soil, gravel, rocks etcetera.

In connection with transportation of heavy loads, e.g. in contracting work, dump vehicles of the type of articulated haulers (also called frame-steered vehicles or dumpers) are frequently used. Such vehicles may be operated with large and heavy loads in areas where there are no roads, for example for transports in connection with road or tunnel building, sand pits, mines and similar environments.

A dump vehicle comprises a forward vehicle section (a so-called engine unit) which in turn comprises a forward frame, an engine, a cab, and a forward wheel axle supported by the frame. The dump vehicle further comprises a rear vehicle section (a so-called load-carrying unit) which in turn comprises a rear frame, a tiltably arranged container for carrying loads, and one or two rear wheel axles supported by the frame. The container is often known as a receptacle, dump body, or the like.

The frame of the engine unit is connected to the frame of the load-carrying unit by means of a special articulation joint allowing the engine unit and the load-carrying unit to pivot in relation to each other about an imaginary axis extending in the longitudinal direction of the vehicle. Thanks to the articulation joint, the engine unit and the load-carrying unit are allowed to move substantially independently of each other.

Recent advancements in electrification and autonomous vehicles provide the opportunity to reduce the complexity of working machines, and hauler vehicles in particular. Such changes in the design necessitate and provide the opportunity to improve numerous features. For example, it is desired to improve the design and functions of the dump body of a hauler vehicle.

SUMMARY

An object of the invention is to provide a dump body for a hauler vehicle, and a hauler vehicle adapted for such a body, which body and vehicle reduces the wear and maintenance need on the pivot axis through which the dump body is attached to the working machine.

According to a first aspect of the invention, the object is achieved by a working machine for carrying a load according to claim 1. The working machine comprises:
 a working machine frame;
 a dump body comprising:
  an open load receiving area outwardly delimited by a load receiving area circumference;
  a load dumping end portion (32) pivotably attached to said working machine frame;
  a load supporting end portion arranged at a distance from said load dumping end portion;
 the working machine frame having a first end portion comprising attachment means for connecting to the dump body such that the dump body is pivotably attached to the working machine frame, and second end portion opposite the first end portion, the second end portion being arranged to support the load supporting end portion of the dump body;
 wherein the dump body comprises at least one guide portion having a guide surface facing downwards and being arranged at the load supporting end portion, the guide portion being configured to transfer the load of the dump body to the working machine frame,
 wherein the second end portion of the working machine frame comprises at least one guiding plate arranged to receive the at least one guide portion of the dump body, whereby the guide portion and the at least one guiding plate are arranged such that the dump body is guided towards a centred position on the working machine during a pivotal downward movement towards the working machine frame.

The at least one guiding plate is arranged to at least partly support the weight of the dump body on the second end of the working machine.

By the provision of a guiding portion and a guiding plate which mutually cooperate to centre the dump body as it is pivoted down to the working machine frame, a reduced complexity compared to the state of the art is achieved. The guiding portion and the guide plate also function to hold the dump body in a centred position when the dump body is resting on the working machine frame. Thereby, the guiding plate can receive at least part of the torque emerging during turning of the vehicle such that a pivot axle towards the load dumping end portion does not need to bear the entire weight from the dump body during turns of the vehicle.

According to one exemplary embodiment, the guide portion comprises at least two guiding means. An advantage is that the load can be spread over two distinct features. Further, this may enable the load path from the dump body to a suspension of the working machine to be short.

According to one exemplary embodiment, the dump body comprises a centre axis, and wherein the at least two guiding means are separated and arranged on opposite sides of the centre axis as projected on a horizontal plane in which the guiding means are arranged. The positioning of the at least two guiding means to the projected centre axis may be symmetrical or non-symmetrical. Stated differently, a first distance from a first guiding means to the projected centre axis may be the same as a second distance from a second guiding means to the centre axis. Alternatively, the first and second distance may differ. Separated may mean that the guide portion in itself is a manufactured as a single feature but that the load points, i.e. the guiding means are separated. Alternatively, the guide portion may comprise two separate guiding means which are manufactured separately.

According to one exemplary embodiment, the at least two guiding means are inclined relative the pivotal downward movement. By being inclined, the guiding means engages the at least one guiding plate of the working machine frame such that the guiding means thereby push, by the mechanical contact with the guiding plate, the dump body into a centred position. Stated differently, the pivotal downward movement of the dump body follows a geometrical arc of a circle, and the at least two guiding means are inclined relative the geometrical arc.

According to one exemplary embodiment, a first guiding means has a mirrored shape of a second guiding means. It should thus be understood that the first and second guiding means are inclined away, or towards the centre axis. Stated differently, a guide portion is mirrored with respect to the other one of the guide portion in a pair of guide portions. It should be understood that the first and second guiding means are comprised in the previously described at least two guiding means.

According to one exemplary embodiment, the at least two guiding means are inclined towards a projection of the centre axis onto the horizontal plane. According to one exemplary embodiment, the at least two guiding means are inclined away from a projection of the centre axis onto the horizontal plane.

According to one exemplary embodiment, the angle of inclination of each one of the guiding means is in the range of 15 degrees to 45 degrees, preferably 20 degrees to 40 degrees. Angle of inclination should be understood to refer to a surface or portions of the guiding means which are to interact with the at least one guiding plate.

According to one exemplary embodiment, the at least one guide portion is welded to the dump body, or wherein the at least one guide portion is integrally formed with the dump body.

According to one exemplary embodiment, the second end portion comprises at least two separate guide plates. The at least two separate guide plates may be arranged in a pair. The at least two separate guide plates may be mirror with respect to a centre axis of the working machine projected onto a horizontal plane in which the at least two separate guide plates are arranged.

According to one exemplary embodiment, wherein each one of the at least one guide plate comprises a plate comprising rubber, or wherein the at least two guide plates each comprises a plate comprising rubber. It is of course possible and within the scope of the invention to use other materials than rubber, for example plastic materials having damping characteristics.

According to one exemplary embodiment, the at least two guide plates are arranged inclined with respect to a horizontal plane, the inclination being towards a centre axis of the working machine being projected onto the horizontal plane, or the inclination being away from a centre axis of the working machine being projected onto the horizontal plane.

According to one exemplary embodiment, the inclination with respect to a horizontal plane is between 15 degrees and 45 degrees, and/or wherein the inclination of the at least two guide plates match the inclination of the respective guiding means.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
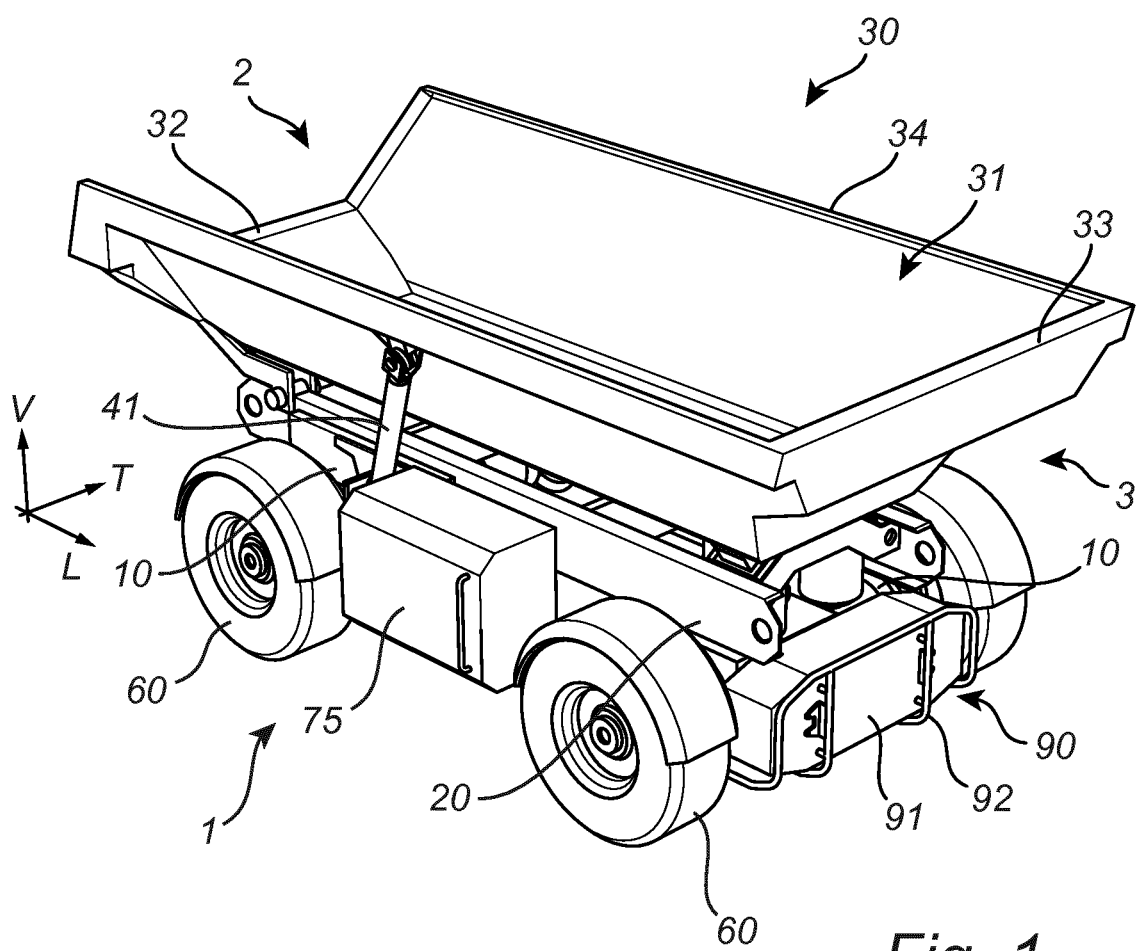
FIG. 1 is a perspective view of a working machine according to one embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In the following, a working machine 1 is described. The inventive concept is applicable on any working machines within the fields of industrial construction machines or construction equipment, in particular dumpers/haulers. Although the invention will be described with respect to a hauler, the invention is not restricted to this particular machine, but may also be used in other working machines such as articulated haulers, excavators, backhoe loaders and wheel loaders.

As seen in FIG. 1 the working machine comprises a dump body 30 for accommodating a load. Merely as an example, and as is indicated in FIG. 1, the dump body 30 may be a loading platform of the working machine 1. The working machine 1 is adapted to have a load receiving condition in which the dump body 30 comprises an open load receiving area 31 outwardly delimited by a load receiving area circumference 34. In FIG. 1 an embodiment is shown where the working machine 1 is adapted to assume the load receiving condition in a normal state. In other words, the working machine 1 embodiment illustrated in FIG. 1 comprises a dump body 30 which always comprises an open load receiving area 31 outwardly delimited by a load receiving area circumference 34. However, it is also envisioned that embodiments of the working machine may comprise cover means (not shown), such as a lid, that is adapted to cover at least a portion of the dump body 30 and which cover means can be moved in order to obtain the open load receiving area 31 to thereby arrive at the open load receiving area 14. Generally, the open load receiving area 31 may be an area that is directly accessible from the environment surrounding the working machine 1. For instance, the open load receiving area 31 may be an area that is directly accessible from the above of the dump body 30.

The working machine does not have a driver seat, but is intended to be autonomously and/or remotely driven. The working machine 1 further comprises a load dumping side 2 and an opposite side which herein referred to as the opposite side 3. The opposite side 3 may be used as a front end side when the machine is driven in the direction that puts the opposite side 3 first. However, the working machine 1 may be drivable in any direction, i.e. it is bidirectional. Further, the dump body 30 comprise a load dumping end portion 32 arranged on the working machines load dumping side 2, and an opposite end portion 33 arranged on the working machines opposite side 3.

Further, still refereeing to FIG. 1 the working machine 1 comprise a working machine frame 20 to which a pair of propulsion axles 10 are mounted. The working machine frame 20 further supports the dump body 30, and thereby carries the load of anything contained in the dump body 30 as well as the weight from the dump body itself. The propulsion axles 10 are equipped with a propulsion hub 14 (not shown in FIG. 1) for driving propulsion means 60. In the figures the propulsion means 60 are illustrated as wheels, however, they may also be crawlers.

Further, an electrical engine 70 is installed onto the propulsion axle 10 being coupled to a drive shaft (not shown). The electrical engine 70 is mounted onto a front side of the propulsion axle's 10 elongated main body, said front side facing away from a centre of the working machine 1. The working machine may comprise one electrical engine 70 on each machine axle 10.

Figure 3:
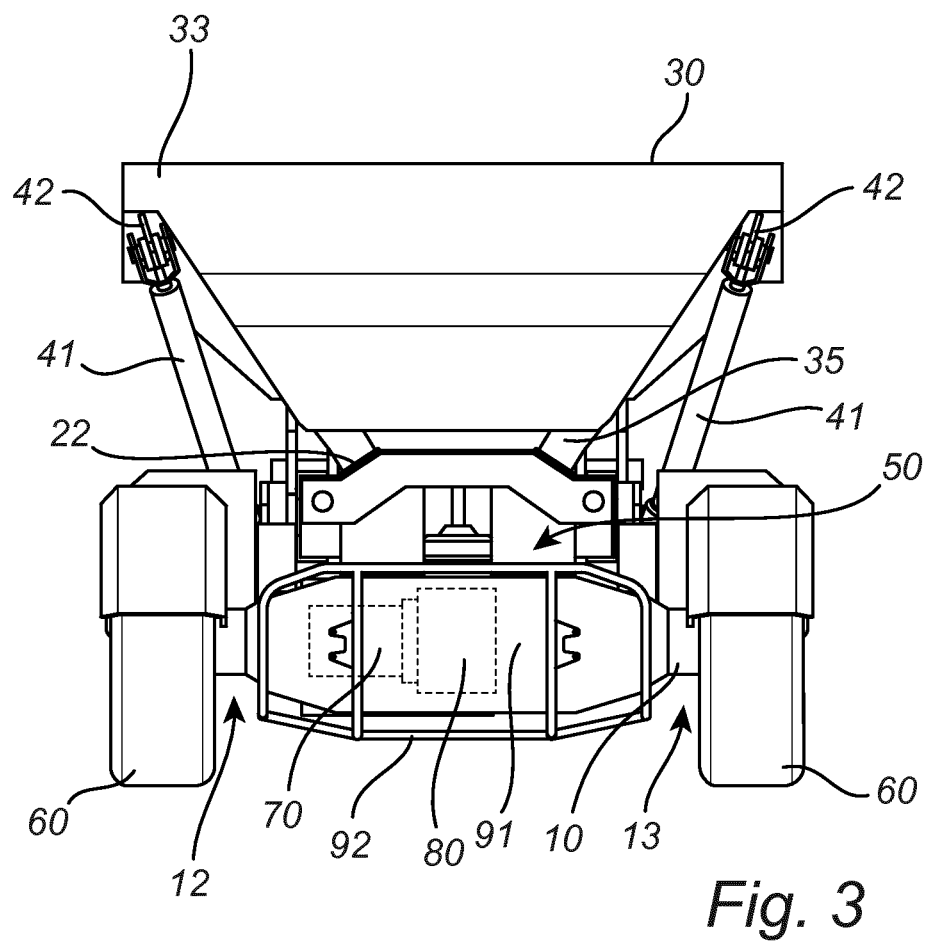
FIG. 3 is a front view of a working machine according to one embodiment of the invention.

Further, the working machine 1 may comprise a tilting arrangement 40, such as a tilting arrangement comprising one or more tilting actuators 41, such as hydraulic actuators, for tilting the dump body 30 of the working machine 1. The tilting arrangement 40 is in one end attached to the frame 20 and in the other end to the dump body 30. Preferably, the tilting arrangement 40 comprise two tilting actuators 41 arranged at different sides of the dump body to ensure a stable tilting (as shown in FIG. 3).

Figure 2:
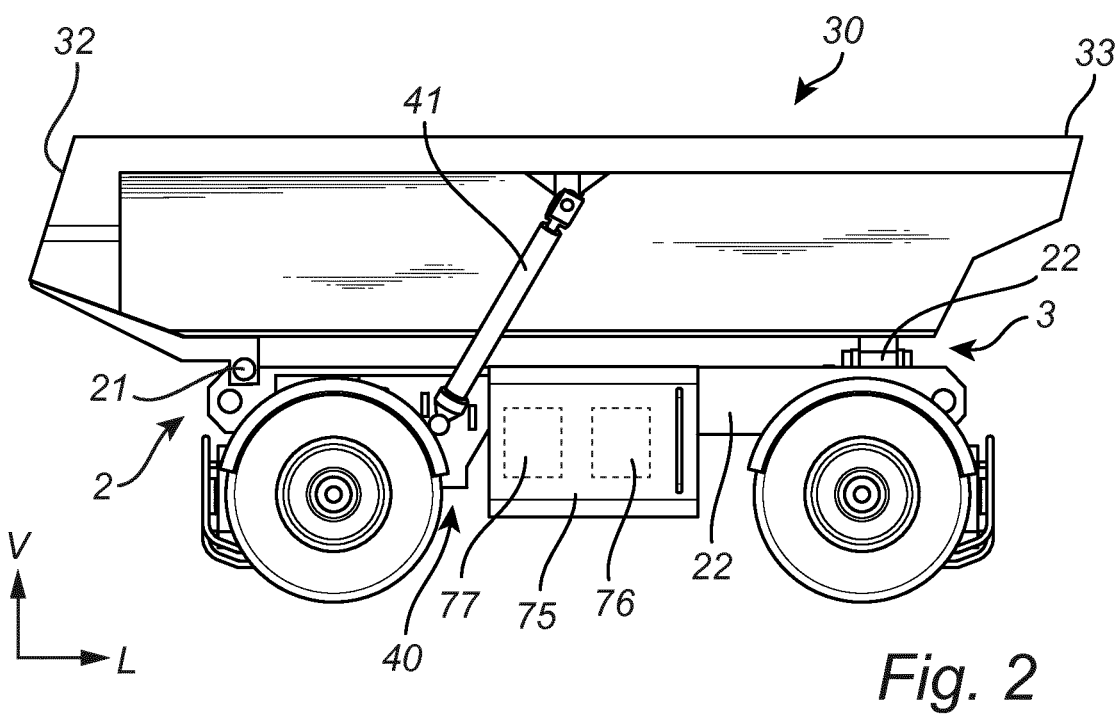
FIG. 2 is a side view of a working machine according to one embodiment of the invention.

FIG. 1 finally disclose an electrical control arrangement 75, arranged to the frame of the working machine 1. The electrical control arrangement 75 may comprise (as illustrated in FIG. 2) a power source 76 e.g. a battery arrangement, for supporting the electrical engine(s) 70 and any other components with power. Further, the electrical control arrangement 75 may comprise a control unit 77 for controlling the working machine. The control unit 77 may be capable of receiving a remote control signal to enable the working machine to be remotely controlled. Such a signal may be received from an external transmission unit (not shown). It may further be capable of communicating any information to or from the working machine from or to a remote server (not shown). Such information may comprise usage data, service information, battery status, load, weight, capacity utilization or any other relevant information.

The load receiving area circumference 34 may form a closed loop that fully encloses a continuously open load receiving area 31. However, some embodiments of the working machine 1 may comprise one or more internal partitioning walls partitioning the open load receiving area 31 into two or more compartments (not shown).

The propulsion axle arrangement 10 also comprises a cover arrangement 90 for covering the electrical engine, wherein the cover arrangement comprises a first (inner) cover 91 and a second cover 92 being arranged on the outside of the first cover.

Turning to FIG. 2, being the side view of the same embodiment of the vehicle, the working machine frame 20 is clearly illustrated as being coupled the propulsions means 60, i.e. the wheels, (via the propulsion axle, which is not seen in this view). Further, the illustration shows that the dump body 30 rests on the working machine frame 20. However, in the illustrated embodiment it is not in contact with the frame 20 during its whole length, but rather at the load dumping side 2 at an attachment means 21 being a pivotal arrangement allowing the dump body 30 to pivot relative the frame 20. The dump body 30 further rests on the frame 20 at a guiding plate portion 22, which will be further described in relation to FIG. 3. Further, the tilting arrangement 40, with one of the side's tilting actuators 41 is clearly sown in FIG. 2. The tilting actuator 41 is in one end attached to the frame 20 and in the other end to the dump body 30. Further, the tilting actuator may be extended so that the dump body's opposite end portion 33 is elevated. Preferably, the tilting arrangement 40 comprise two tilting actuators 41 arranged at different sides of the dump body to ensure a stable tilting, and to spread the load on two actuators enabling a lower dimension of the tilting actuators for the same load.

As is also clearly shown in FIGS. 1 and 2, the working machine 1 extends in at least a longitudinal direction L, a vertical direction V and a transversal direction T. The longitudinal direction L is parallel to an intended direction of travel of the working machine 1. Further the transversal direction T is perpendicular to each one of the vertical direction V and the longitudinal direction L. That is, the transversal direction T is parallel to the general extension of the propulsion axles 10. These directions are intended to be interpreted relative the working machine, and should not be interpreted as being dependent of the vehicle's orientation.

Further, the electrical control arrangement 75 is illustrated in the side view of FIG. 2. The placement of the electrical control arrangement 75 should only be considered to be an example. It is preferably arranged between the two working machine axles 10 and coupled to the frame 20, but the exact placement may be chosen in so that it is functionally placed in the environment which the working machine is to be used. Having the electrical control arrangement 75 on the outside of the frame, so that it is accessible from the side of the vehicle gives that advantage that both maintenance is facilitated and that any transceiving unit in the control arrangement, sending and/or receiving information may obtain a better signal and/or range. However, it would be possible to place the electrical control arrangement 75 transversally central on the working machine, i.e. under the dump body 30.

The dump body 30 of the working machine may further be designed so that the working machine 1 can assume a position relative to a second working machine of the same type, in which position the dump bodies at least partly overlap in at least the longitudinal or transversal direction. Generally, overlap of the dump bodies may be obtained on any side of the working machines 1. For instance, the overlap may be obtained along the longitudinal sides or the transversal sides of the working machines 1. For example, the above overlap may be at least 2%, preferably at least 5%, more preferred at least 8% of the load receiving length of the open load receiving area 31 in said longitudinal direction L.

Further, in FIG. 3 the working machine is shown in a front view, in one embodiment of the invention. In the front view, the working machine 1 is illustrated from one of the transversal sides, and more specifically from the side called the opposite side 3, being the side opposite of the load dumping side 2. The frame 20 is coupled to the propulsion axle 10, via the suspension arrangement 50 allowing the frame 20 to move relative the propulsion axle 10 in the vertical plane. Further, the propulsion axle comprises two opposing end portions 12, 13 each having a propulsion hub (not shown) coupled the propulsions means 60, i.e. the wheels in this embodiment. Further, the dump body 30 rests on the working machine frame 20 at a guiding plate portion 22. The dump body 30 comprise a load supporting end portion 35, which cooperates with a guiding plate portion 22 and works as a guiding means for guiding the dump body towards a transversally centred position during a pivotal downward movement of the dump body relative the frame. The formation of these guiding plate portions and load supporting end portions may be formed with an angle to a horizontal plane, i.e. with a vertical inclination. Further, the tilting arrangement 40 is clearly shown having two tilting actuators 41 arranged on each longitudinal side of the dump body. The tilting actuators 41 are attached to the dump body 30 at its top portion in a rotational coupling 42. Further, the tilting actuator may be extended so that the dump body's opposite end portion 33 is inclined. Finally, FIG. 3 illustrates that the propulsion axle is equipped with an electrical engine 70 being drivably coupled to a drive shaft inside the propulsion axle (thus not shown) and mounted onto the illustrated front side 16 of the elongated main body 11, said front side 16 facing away from a centre of the working machine 1 in the transversal direction. This is further illustrated in the subsequent figures. In FIGS. 1-3 the electrical engine 70 and gear box 80 are hidden by the engine cover 90, and is thus only noted with a dashed line in FIG. 3.

Figure 4:
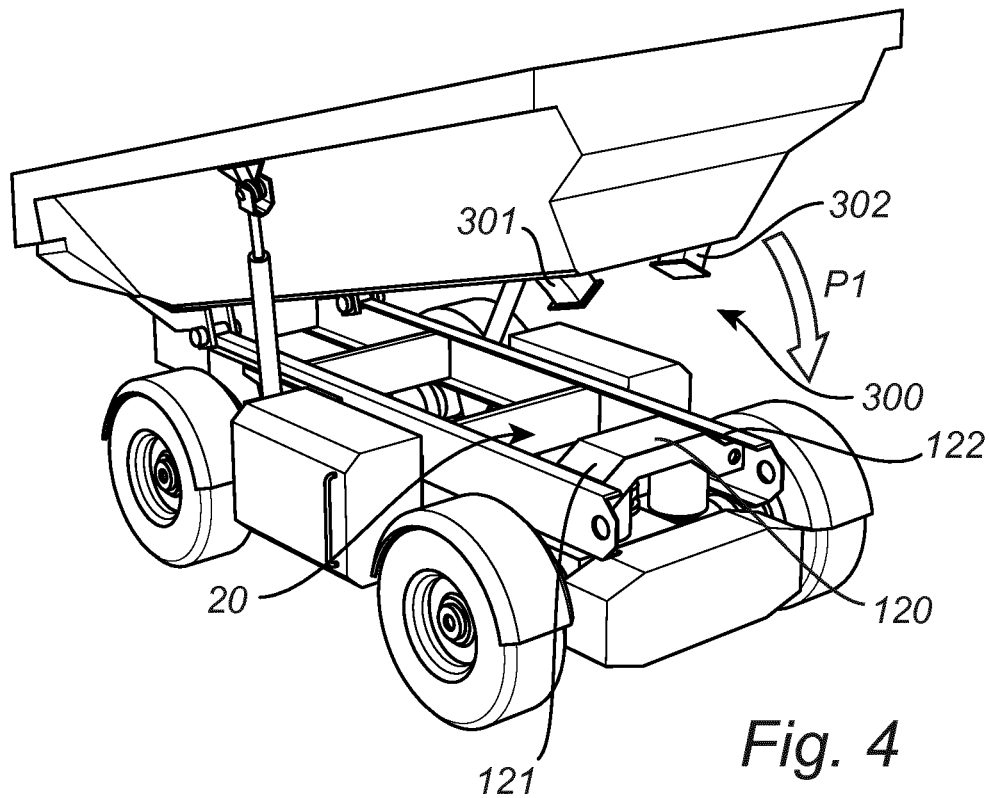
FIG. 4 is a perspective view of a working machine according to one embodiment of the invention.

FIG. 4 illustrates the working machine 1 where the dump body 30 is pivoted away from the working machine frame 20. The working machine frame 20 comprises bracket 120 in the form of a guiding plate 120. The guiding plate 120 comprises a central portion which is flat and two sloped portions 121, 122 surrounding the central portion. The sloped portions 121, 122 may also each comprise a plate 125 made of or comprising rubber (see FIG. 5). The plate 125 may be made of any other suitable material such as plastic or the like.

The dump body 30 comprises at least one guide portion 300 having a guide surface facing downwards and being arranged at the load supporting end portion of the dump body 30. The guide portion 300 is configured to transfer the load of the dump body 30 to the guiding plate 120 when the dump body 30 rests on the working machine frame 20 together with the attachment means. In FIG. 4 the guide portion is shown as two separate guiding means 301 and 302 attached to the dump body 30. The guiding means 301, 302 may be attached by welding, soldering, bolting, riveting etcetera. The guiding means 301, 302 may also be formed integrally of the dump body 30, e.g. by being formed from a portion of a steel plate being a portion of the dump body 30.

As can be seen in FIG. 4 the guide portion 300 and the guiding plate 120 formed and arranged such that the dump body 30 is guided towards a centred position on the working machine 1 during a pivotal downward movement, indicated by arrow P1, towards the working machine frame 20. Therefore, the guiding means 301, 302, similarly to the sloped portions 121, 122 of the guiding plate 120, are also sloped such that when the guiding means 301, 302 mechanically contact the sloped portion 121, 122 the dump body 30 is guided towards a centred position.

Sloped should in the foregoing and hereinafter be understood as the sloped portions 121, 122 and the guiding means being inclined relative the pivotal movement, i.e. along the arrow P1, and relative the horizontal plane, i.e. in the transversal direction T of the working machine 1. The sloped portions 121, 122 and the guiding means 301, 302 may be seen as mirrored, i.e. that they are a paired and inclined in the same manner towards a centre axis but mirrored.

Figure 5:
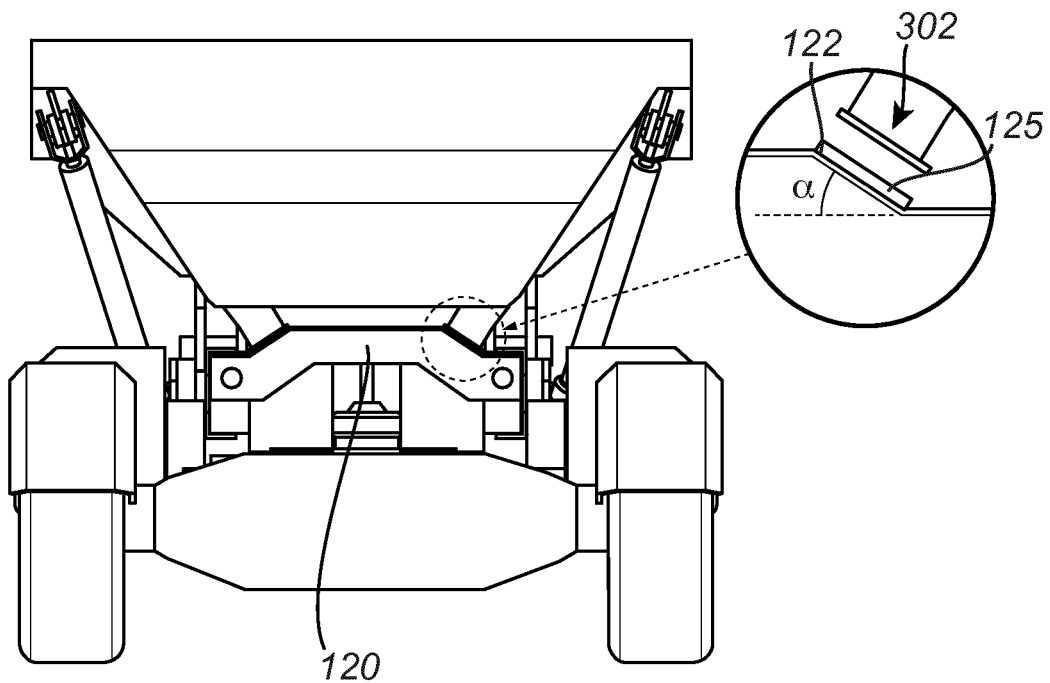
FIG. 5 is a front view of a working machine according to one embodiment of the invention.

Turning to FIG. 5, showing the dump body 30 of the working machine 1 resting on the guiding means 310, 302 and the guiding plate 120 after a pivotal downwards movement in FIG. 4 is completed. Also shown in enlargement are the sloped portions 122 and the guiding means 302. It should be understood that the other side, i.e. sloped portion 121 and the guiding means 301 are identical in function and parameters as the following. The guiding plate 122 may comprise a plate 125 made of or comprising rubber as mentioned above. The plate 125 may have uniform thickness. Alternatively, the plate 125 may have a non-uniform thickness in order to provide at least some of the incline for the guiding plate 122 such that the incline of the guiding plate 122 match the incline of the guiding means 302 through the use of the plate 125.

The angle of inclination of the guiding plate 122, and the guiding means 302 is denoted as α in FIG. 5. The angle of inclination α may be in in the range of 15 degrees to 45 degrees, preferably 20 degrees to 40 degrees. The angle of inclination α may for example be 25 degrees. By having an angle of inclination α in this range the sheer forces on the plate 125 is optimized, while still retaining the guiding function. As mentioned above, the angle of inclination of the guiding plate 122 and the guiding means 302 may differ, and this difference may be corrected through a plate 125 having non-uniform thickness. However, most commonly the angle of inclination of the guiding plate 122 is set to the same angle of inclination as the guiding means 302. Hence, the angle of inclination of the two guide plates 121, 122 matches the inclination of the guiding means 301, 302. Stated differently, the sloped portions may be complimentary shaped with respect to a guide portion (not illustrated) on the dump body 30 such that the sloped portions and the guide portion on the dump body 30 cooperate to guide the dump body 30 during a pivotal downwards movement towards the frame into a centred positions with respect to the working machine frame 20. The sloped portions may, together with the flat central portion, receive at large portion of the weight of the dump body 30.

Figure 6:
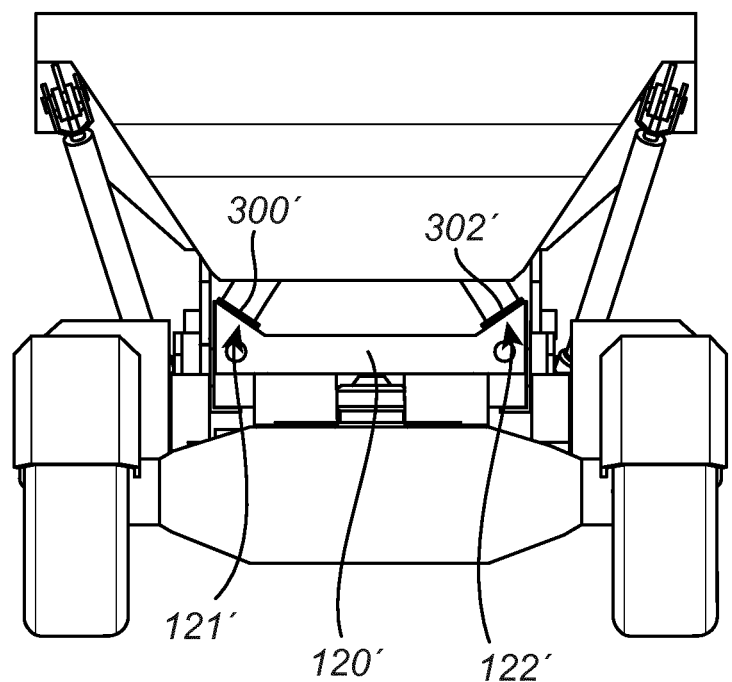
FIG. 6 is a front view of a working machine according to one embodiment of the invention.

FIG. 6 shows an alternative embodiment of the guiding plate 120' and the guiding means 301', 302'. The main difference is that the guiding means 301', 302' are inclined away from a centre axis of the dump body as projected onto a horizontal plane, whereas the guiding means 301, 302 are inclined towards a centre axis of the dump body 30 as projected onto a horizontal plane. Similarly, the bracket 120' comprises sloped portions 121', 122', i.e. guide plates 121', 122' which are inclined away from a centre axis of the working machine as projected onto a horizontal plane. The angle of inclination of the guiding means 301', 302' and the guide plates 121', 122' may be the same as for the guiding means 301, 302 and the guide plates 121, 122. The guide plates 121', 122' may comprise a plate (not shown) made of rubber or a similar material in the same manner as explained in connection with FIGS. 4 and 5.

The skilled addressee realized that although the guiding plate and guiding means is shown as a single pair here, the invention also encompasses using a plurality of such features, for example along the length of the working machine in order to guide and support the dump body. Further, at least one embodiment of the invention which is not shown is of course the possibility for the guide portion to be a single features, such as an arc, or a shape with a flat central portion and sloped (inclined) portions surrounding the central portion similar to the guiding plate 120 such that the guide portion 300 and guiding plate 120 are complementary shaped single features shaped to perform the functioned elucidated above in connections with FIG. 4-6.

It is to be understood that the present invention is not limited to the embodiments described above and illustrated in the drawings; rather, the skilled person will recognize that many changes and modifications may be made within the scope of the appended claims.

The invention claimed is:

1. An autonomously electrically driven working machine for carrying a load comprising:
   a working machine frame;
   a dump body comprising:
      an open load receiving area outwardly delimited by a load receiving area circumference;
      a load dumping end portion pivotably attached to said working machine frame;
      a load supporting end portion arranged at a distance from said load dumping end portion; and
      said working machine frame having a first end portion comprising attachment means for connecting to the dump body such that the dump body is pivotably attached to the working machine frame, and a second end portion opposite the first end portion, the second end portion being arranged to support the load supporting end portion of the dump body;
      the dump body comprising a center axis and at least one guide portion having a guide surface facing downwards and being arranged at the load supporting end portion, the at least one guide portion comprising at least two guiding means separate and arranged on opposite sides of the centre axis as projected on a horizontal plan in which the guiding means are arranged, and being configured to transfer the load of the dump body to the working machine frame, and
      the second end portion of the working machine frame comprising at least two separate guiding plates arranged to receive the at least two guiding means of said dump body, each one of the at least two guiding plates being arranged inclined with respect to a horizontal plane, the inclination being towards a center axis of the working machine being projected onto the horizontal plane, or the inclination being away from a center axis of the working machine being projected onto the horizontal plane,
      the two guiding means and the at least two guiding plates are being arranged such that the dump body is guided towards a centered position on the working machine during a pivotal downward movement towards the working machine frame wherein the inclination of each one of the at least two guiding plates with respect to the horizontal plane is between 15 degrees and 45 degrees, and wherein the inclination of the at least two guide plates match the inclination of the respective guiding means.

2. A working machine according to claim 1, wherein the at least two guiding means are inclined relative to the pivotal downward movement.

3. A working machine according to claim 1, wherein a first guiding means of the at least two guiding means has a mirrored shape of a second guiding means of the at least two guiding means.

4. A working machine according to claim 1, wherein the at least two guiding means are inclined towards a projection of the center axis onto the horizontal plane.

5. A working machine according to claim 1, wherein the at least two guiding means are inclined away from a projection of the center axis onto the horizontal plane.

6. A working machine according to claim 4, wherein an angle of inclination of each one of the at least two guiding means is in a range of 15 degrees to 45 degrees.

7. A working machine according to claim 1, wherein the at least one guide portion is welded to the dump body, or wherein the at least one guide portion is integrally formed with the dump body.

8. A working machine according to claim 1, wherein the at least one guiding plate comprises a plate comprising rubber, or wherein the at least two separate guide plates each comprises a plate comprising rubber.

* * * * *